United States Patent [19]

Wagner

[11] Patent Number: 4,540,214
[45] Date of Patent: Sep. 10, 1985

[54] TRUCK BED LINER SECURING FIXTURE

[75] Inventor: James A. Wagner, Bristol, Ind.

[73] Assignee: LRV Corporation, Elkhart, Ind.

[21] Appl. No.: 612,412

[22] Filed: May 21, 1984

[51] Int. Cl.³ .............................................. B62D 33/02
[52] U.S. Cl. ................................. 296/39 R; 105/423; 224/42.42
[58] Field of Search ................... 296/39 R, 39 A, 183, 296/199; 224/42.42 R; 105/423

[56] References Cited

U.S. PATENT DOCUMENTS

| | | | |
|---|---|---|---|
| 3,814,473 | 6/1974 | Lorenzen, Jr. | 296/39 R |
| 3,881,768 | 5/1975 | Nix | 296/39 R |
| 3,912,325 | 10/1975 | Sudyk | 296/39 R |
| 4,047,749 | 9/1977 | Lambitz et al. | 296/39 R |
| 4,111,481 | 9/1978 | Nix et al. | 296/39 R |

Primary Examiner—Robert R. Song
Attorney, Agent, or Firm—James D. Hall

[57] ABSTRACT

A fixture for securing a liner in a pickup truck bed, having a body with a horizontal groove on the external side for slipping over a protrusion on the inside of the truck bed wall, and an upper inner corner for seating against a downwardly extending lip on the inwardly extending flange at the upper edge of the pickup truck side wall, whereby the fixture is held between said protrusion and lip. The fixture has an inwardly facing wall for engaging the side wall of the liner and for receiving a screw or the like extending through the liner side wall into the body of the fixture, thereby securing the liner in the truck bed without preventing expansion and contraction of the side walls in a horizontal direction.

14 Claims, 4 Drawing Figures

TRUCK BED LINER SECURING FIXTURE

BACKGROUND OF THE INVENTION

In new pickup trucks, the walls of the truck bed are usually painted with a color similar to that on the external side walls of the vehicle. When the trucks are new, the beds, which can be easily seen from outside the vehicle, appear essentially as attractive as the external finish on the vehicle. However, with use of the truck to haul materials, packages, and other articles, particularly those which are relatively heavy, the bottom and sides often become scratched and scraped to the extent that the metal of the bottom and side walls becomes exposed and, hence, often becomes rusted and discolored. This seriously detracts from the appearance of the truck bed and often renders it unsuitable for other than industrial or agricultural uses of the vehicle, such as for family errands or mere transportation. In order to prevent this damage to the internal walls of the truck bed from occurring, industry has developed and used a liner, which fits into the bed, resting on the bottom and against the forward end and side walls. This liner provides effective protection to the side walls, so that, when the truck is to be used for only transportation and similar purposes, or when it is to be sold, the liner can be removed and the original paint then exposed in substantially the same condition as it was when the truck was initially purchased. Further, the liner normally is made of plastic material which will withstand the abrasive effect of the materials or products hauled in the truck and can be cleaned more effectively than the original truck bed.

In the past, in order to secure the liner in place in the truck bed, the liner was provided with outwardly extending flanges at the upper edges of the two side walls, with the flanges extending outwardly over the upper edge of the two walls and in close proximity thereto. Holes were drilled through the flanges into the upper edges of the sides of the truck bed, and screws were inserted therein to secure the flanges and, hence, the liner in place in the bed. This type of structure, which was extensively used in the trade to secure the liner in place, had several disadvantages, including the drilling of holes in the upper edges of the new side walls of the bed, which exposed the bare metal in the side walls of the truck and, hence, permitted corrosion to take place, so that when the truck was to be sold, the upper edges of the side walls were disfigured, possibly decreasing the sale price of the used truck. Further, the truck liners being of a plastic material and the truck beds being of a metal material resulted in nonuniform expansion when they were subjected to heat and cold; hence, there was a tendency for the flanges and portions of the side walls of the liner to buckle as the bed and liner were exposed to the hot sunshine. This placed a strain on the liner and, in some instances, resulted in cracking of the flanges in and around the screws, eventually requiring replacement of the liner. Since the truck beds were of sheet metal, the exposed metal around the holes of the securing screws readily rusted and disintegrated, so that substantial damage was done to the upper edges of the sides of the bed, and sometimes resulted in the loosening of the screws and, hence, loosening of the liner in the bed.

Another type of liner securing means which has been used commercially consists of expansion anchoring bolts extending through the outwardly extending flanges into the stake pockets of the bed side walls. This type of securing means also has much the same disadvantages as the previously described screws in the flanges, particularly with respect to the nonuniform expansion of the bed liner in response to changes in temperature.

SUMMARY OF THE INVENTION

It is, therefore, one of the principal objects of the present invention to provide a fixture for securing a liner in a truck bed, in which no holes are drilled in the side walls or at any other place of the truck bed, and in which the liner is securely held in place without damaging the original structure of the truck bed.

Another object of the invention is to provide a system and fixture for securing a liner in a bed of a pickup truck or the like, which permits the liner and side walls of the bed to expand nonuniformly, without causing any distortion or damage to the liner, and which does not scar or otherwise mar the exposed surfaces of the truck bed walls, while at the same time providing effective protection to the walls from materials, products, and articles hauled therein.

A further object is to provide a fixture for securing a liner in the bed of a truck, such as a pickup truck, which is simple in construction and can be readily attached to the side walls of the truck to hold the liner in place, and which can be released so that the liner can easily be removed from the truck bed without leaving a marred appearance on the internal side walls of the bed.

The present invention is designed for use with pickup truck beds which have side walls formed by the external sheet metal side walls of the vehicle, with an inwardly extending upper edge flange and downwardly extending lip along the inside of the bed. When a liner is to be secured in place, a fixture is seated along the inner side of the outside wall panel of the bed and on the internal surface of the downwardly extending lip, and one or more screws are inserted through holes in the side wall of the liner into the fixture. As the screw is tightened, the side walls of the liner are seated against the fixture, which is secured in place by a restrictive fit between the outside wall panel and the downwardly extending lip. Since the screws do not extend into the metal of the bed side walls, but only through the plastic side walls of the liner and into the material of the fixture, the liner can expand and contract in response to changes in temperature without encountering any serious resistance, by the slipping of the fixture horizontally as the liner expands and contracts, thereby preventing any buckling or other distortions from occurring in the liner side walls. Further, the fixture permits the liner to adapt itself more effectively to the size and contour of the truck bed, without placing any strain on the liner. The fixture may be made of different kinds of material, such as wood in the form of a block, or plastic or metal shaped to fit in the restricted area between the outside wall panel and downwardly extending lip.

Various other objects and advantages of the present system and fixture for securing liners in truck beds will become apparent from the following description and accompanying drawings.

DETAILED DESCRIPTION OF THE PREFERRED EMBODIMENT

Figure 1:
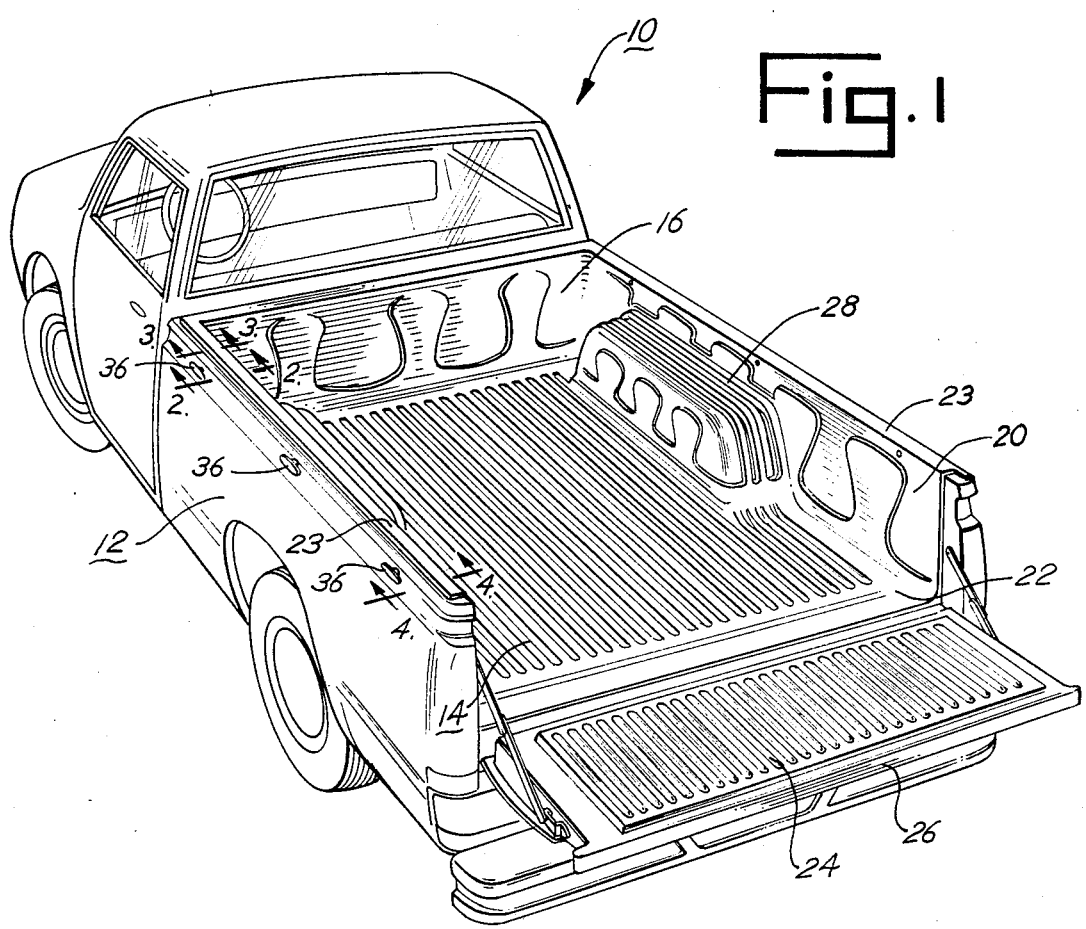
FIG. 1 is a perspective view of a pickup truck showing the bed with a liner secured in place therein, using the system and fixtures of the present invention.

Referring more specifically to the invention, and to FIG. 1 in particular, numeral 10 indicates generally the pickup truck having a bed 12 with a pre-formed liner 14 seated and secured therein. The liner has a front end wall 16, side walls 18 and 20, and bottom 22, the three walls and bottom being formed integrally with one another in the position which they ultimately assume in the truck bed. An outwardly extending flange 23 is provided at the upper edges of the two side walls and end walls. The rear end wall 24, which is not connected to the pre-formed bed liner, is secured to the internal side of tailgate 26. The liner, which is of relatively heavy plastic and is normally black, but may be of any desired color, has generally the contour of the inner side walls of the bed, including wells 28 on each side for receiving the wheel wells of the bed. When the liner is installed in the truck bed, it serves as the inner walls, which are in contact with any materials or articles placed in the bed, and the liner normally remains permanently in the bed until it is removed for resale of the truck.

The side walls of the vehicle and truck bed are formed of sheet metal, and have an external panel 30 with an inwardly extending upper edge flange 32 and a downwardly extending internal lip 34. The sheet metal is relatively rigid and retains its shape in normal use of the bed, and the external surfaces of the upper flange 32 and lip 34 are finished in much the same way the external surface of the vehicle is finished. A plurality of tie-down brackets 36, three being shown, are provided on each side of the bed for securing a load in or a cover on the bed, and they are anchored to panel 30 by a nut 37 and plate 38 secured by welding to the internal side of the panel. A stem 39 of the bracket has a threaded end which is tightened into nut 37 to securely hold the bracket.

Figure 2:
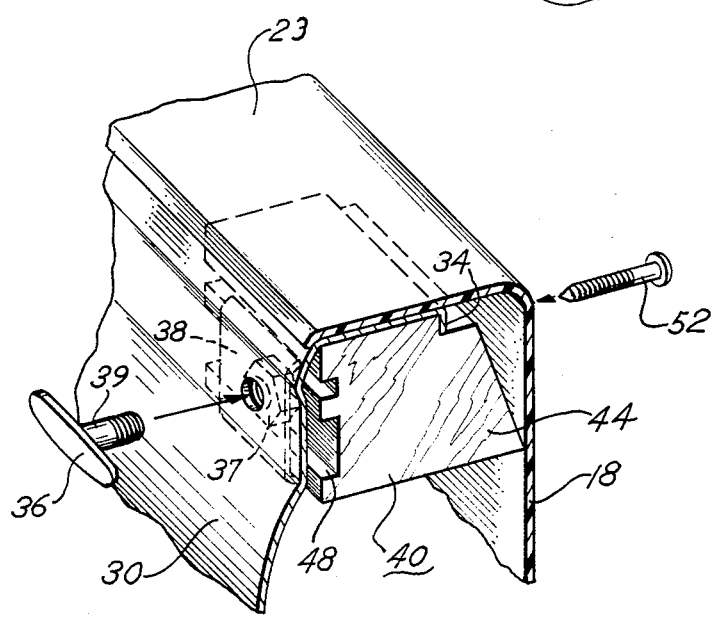
FIG. 2 is a fragmentary, perspective cross-sectional view through the wall of the pickup truck bed and liner therein, showing the present fixture, the section being taken on line 2—2 of FIG. 1.
Figure 3:
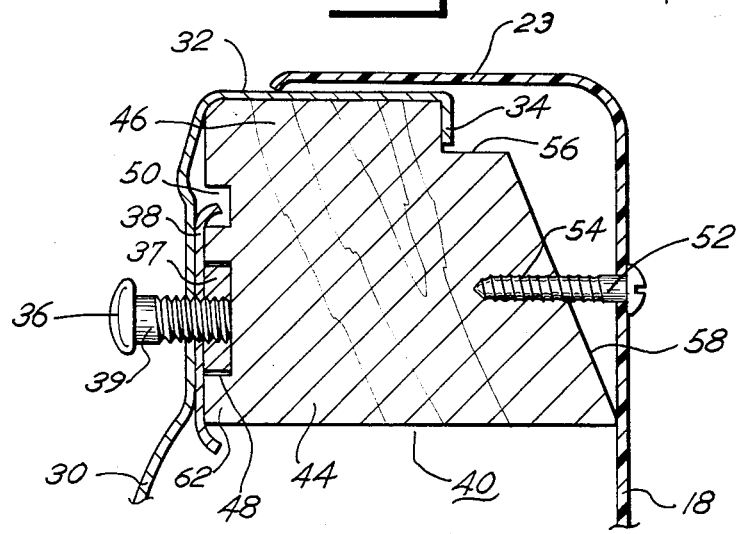
FIG. 3 is a fragmentary, vertical cross-sectional view of the wall of the pickup truck bed and liner, illustrating one embodiment of the fixture used in securing the liner in the pickup truck bed, the section being taken on line 3—3 of FIG. 1.
Figure 4:
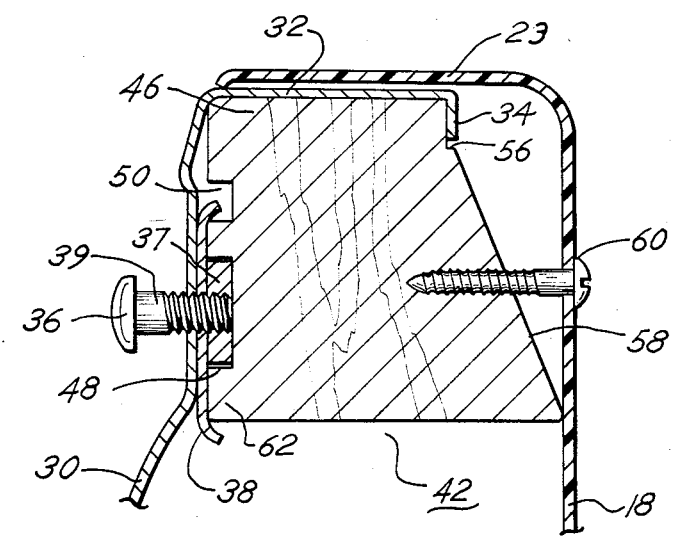
FIG. 4 is a fragmentary, vertical cross-sectional view of the wall of the pickup truck bed and liner, illustrating another embodiment of the fixture used in securing the liner in the pickup truck bed, the section being taken on line 4—4 of FIG. 1.

The liner is secured in place in the bed by a plurality of fixtures, such as those shown at numerals 40 and 42 of FIGS. 3 and 4, respectively. Fixture 40 consists of a body 44 of wood or other suitable material, having an upper end 46 which is substantially the same width as the distance between the upper edge of panel 30 and lip 34; thus, a rather close fit is provided between the body and the upper portion of the truck bed side wall. The outside surface of the body contains a lower longitudinal groove 48 which embraces nut 37, and an upper longitudinal groove 50 which receives the rolled over edge of plate 38. When the fixture is seated in position, as shown in FIG. 3, it is held securely in place by downwardly extending lip 34, the side wall panel 30, and nut 37. The outer surface of the body 44 is adapted to contact the external surface of the side wall of the liner, which is held firmly to the body by a screw 52 extending through a hole in the liner and into a hole 54 in the body of the fixture. When the screw is tightened, the wall is held rigidly against the fixture; thus, since the body is held firmly along the internal side of wall 30 by nut 37 and lip 34, the side wall of the liner is secured in place. As seen in FIG. 2, the fixture is approximately three inches in width and two inches in height, although these dimensions may be varied to meet the dimensions of the side walls of the truck bed. The relationship of groove 48 and notch 56, which receives lip 34, must be maintained in order to assemble the fixture in a secured position in the truck bed side wall. When the fixture is to be assembled in place, as shown in FIG. 3, it is slipped beneath the upper edge flange 32 at the forward or rearward end of plate 38, and then slipped horizontally to permit groove 48 to embrace nut 37, as shown in FIGS. 2, 3, and 4. When it is in this position, the fixture can not be removed without slipping it endwise until the nut is free of groove 48. When the fixture is in this position, it is wedged or held between lip 34 and nut 37 and the upper edge flange 32, and is held against horizontal longitudinal movement when the liner has been secured in place by screw 52.

Fixture 42 is essentially the same as fixture 40 and, consequently, like numerals for like parts will be used in describing the fixture 42. The only significant difference between the two fixtures is that the width of the fixture 42 at the bottom is narrower than the corresponding width of fixture 40. Fixture 42, with the narrower width, is used at the rear of the bed of the pickup truck, in that the side walls of the liner can be spread apart, since they are not restricted by an end wall, such as end wall 16. While the degree of the taper on the inner side 58 of body 44 is the same in fixture 42 as in fixture 40, the width of the body is less in fixture 42 than in fixture 40, thus creating a smaller notch 56 into which lip 34 is seated. Fixture 42 is held in place in the same manner as fixture 40, namely, by being wedged or held between the inner side of downwardly extending lip 34 and nut 37, fixture 42 being assembled in place in the same manner as fixture 40, by sliding the fixture horizontally to permit the groove 48 to embrace nut 37. Fixture 42 is finally secured in place by screw 60 extending through the liner into holes in the fixture.

While the specific embodiments shown in the drawings and described in the specification are constructed of wood, various other materials, such as plastic or sheet steel formed with an exterior contour on the two sides and top, can be used if desired. Since groove 50 has been included merely for the purpose of accommodating the in-turned upper edge of plate 38, elimination of this in-turned edge would eliminate the need for groove 50. Also, the lower edge 62 defining the lower part of groove 48 can be eliminated without affecting the operation of the groove or fixture, and, while nuts 37 form effective supports for the fixtures to help hold them in place, other types of protrusions, if suitably located, can be used in place of the nuts.

In the use and operation of the fixture for securing a liner in the bed of a pickup truck, fixtures 40 are assembled in the truck bed in the manner illustrated in FIG. 2, at the nuts of the forwardmost tie-down bracket 36 on each side of the bed. Fixtures 42 are assembled in place in the same manner, at the nuts of the rearwardmost tie-down bracket 36 on each side of the bed. With these four fixtures inserted in place, the liner is placed in the bed, holes are drilled through the liner side walls at the fixtures, and the screws are inserted through the holes into holes in the fixtures and tightened to draw the side walls firmly against the fixtures near the bottom thereof. After all of the screws have been tightened, the liner is held firmly in place in the bed and is prevented from sliding forwardly by the front end of the bed and rearwardly by the interlocking relationship between the wheel wells of the bed and liner. The bed side walls are nevertheless capable of expanding and contracting in response to changes in temperature without distortion of or damage to the liner.

While the liner is normally not removed during the time one owner has possession of the vehicle, the liner may be removed easily at any time, for example when the vehicle is to be sold, to give the vehicle the maximum effective appearance. The liner can be readily removed from the bed by merely removing screws 52 and 60 from the respective fixtures, thus releasing the liner from the bed. After the liner has been removed, the fixtures 40 and 42 can be easily removed by slipping them horizontally forwardly or rearwardly to clear the respective nuts 37, thereby permitting the fixtures to drop downwardly free of the truck bed side walls.

While only one embodiment of the fixture for securing liners in pickup truck beds has been described in detail herein, various changes and modifications may be made without departing from the scope of the present invention.

I claim:

1. The combination of a truck bed having side walls with a protrusion on the inner side spaced downward from the upper edge and an inwardly extending top flange with a downwardly extending lip, a liner for the bed having side walls positioned along the inner side of the bed side walls and adjacent thereto, and a plurality of fixtures slidably securing the liner side walls to the respective bed side walls, each fixture including a body disposed beneath the respective bed side wall flange and having a horizontal groove for slipping over the protrusion on the bed side walls, and an upper inner corner for seating against the inner side of said lip for holding said fixture between said protrusion and said lip, and a screw-like securing means extending through the adjacent liner side wall into said body to hold the respective side wall against said body.

2. The combination defined in claim 1 in which said fixture has an angular outwardly and downwardly facing inner side for receiving said screw-like means.

3. The combination defined in claim 2 in which said body has a notch at said upper inner corner for receiving said lip, said notch and horizontal groove extending the full length of said body.

4. The combination defined in claim 1 in which said body has a notch at said upper inner corner for receiving said lip, said notch and horizontal groove extending the full length of said body.

5. The combination defined in claim 1 in which said body has a notch at said upper inner corner for receiving said lip.

6. The combination defined in claim 5 in which said body is constructed of solid wood.

7. The combination defined in claim 1 in which said body is constructed of solid wood.

8. A fixture for use in securing a liner in a pickup truck bed having side walls with a protrusion on the inner side spaced downwardly from the upper edge, and an inwardly extending top flange with a downwardly extending lip, said fixture comprising a body having a horizontal groove for slipping over the protrusion on the bed side wall and an upper inner corner for seating against the inner side of said lip for holding said fixture between said protrusion and said lip, and a screw-like means extending through an adjacent liner side wall into the body to hold the respective side wall against said body.

9. A fixture for securing a liner in a pickup truck bed as defined in claim 8 in which said body has a notch in its upper inner corner and an inner side extending downwardly and outwardly for engagement with the liner side wall and for receiving said screw-like securing means.

10. A fixture for securing a liner in a pickup truck bed as defined in claim 9 in which said horizontal groove and notch extend from end to end of said body.

11. A fixture for securing a liner in a pickup truck bed as defined in claim 8 in which said horizontal groove extends from end to end of said body.

12. A fixture for securing a liner in a pickup truck bed as defined in claim 8 in which said body has a notch at said upper inner corner for receiving said lip, and said notch and horizontal groove extend the full length of said body.

13. A fixture for securing a liner in a pickup truck bed as defined in claim 12 in which said body is constructed of wood.

14. A fixture for securing a liner in a pickup truck bed as defined in claim 8 in which said body is constructed of wood.

* * * * *